United States Patent
Parida et al.

(10) Patent No.: US 12,463,433 B1
(45) Date of Patent: Nov. 4, 2025

(54) DISTRIBUTED INERTIA-ENHANCEMENT CONTROL METHOD OF THE DC-BUS VOLTAGE OF A LOW-INERTIA DC MICROGRID

(71) Applicant: Hong Kong Applied Science and Technology Research Institute Company Limited, Hong Kong (HK)

(72) Inventors: Nibedita Parida, Hong Kong (HK); Chun Kit Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/894,505

(22) Filed: Sep. 24, 2024

(51) Int. Cl.
  *H02J 3/38* (2006.01)
  *G05B 13/04* (2006.01)
  *H02S 40/30* (2014.01)

(52) U.S. Cl.
  CPC ............... *H02J 3/381* (2013.01); *G05B 13/04* (2013.01); *H02J 2300/26* (2020.01); *H02S 40/30* (2014.12)

(58) Field of Classification Search
  CPC ...... H02J 3/381; H02J 2300/26; G05B 13/04; H02S 40/30
  See application file for complete search history.

(56) References Cited

U.S. PATENT DOCUMENTS

| | | | |
|---|---|---|---|
| 2010/0157638 A1* | 6/2010 | Naiknaware | H02M 7/4807 363/131 |
| 2016/0241078 A1* | 8/2016 | Miyoshi | H02J 7/35 |

(Continued)

FOREIGN PATENT DOCUMENTS

| | | |
|---|---|---|
| CN | 106877368 A | 6/2017 |
| CN | 206742872 U | 12/2017 |

(Continued)

OTHER PUBLICATIONS

Dan Wu et al. "Coordinated Control Based on Bus-Signaling and Virtual Inertia for Islanded DC Microgrids", IEEE Transactions on Smart Grid, vol. 6, Issue: 6, Nov. 2015.

(Continued)

*Primary Examiner* — Charles Cai
(74) *Attorney, Agent, or Firm* — Stuart T. Auvinen; g Patent LLC

(57) ABSTRACT

A DC microgrid has increased DC bus voltage inertia without adding large physical capacitors. A Virtual Inertia Enhancement Controller (VIEC) of a DC-DC converter emulates a DC machine's mechanical inertia characteristics through a virtual capacitor which compensates for a power imbalance causing DC bus voltage fluctuations. When a battery charges and generated photovoltaic (PV) power is more than the load power, VIEC controls the PV's DC-DC converter to the DC bus. When the battery discharges and generated PV power is less than load power, VIEC controls the battery's DC-DC converter to the DC bus. VIEC controls both the PV's DC-DC converter and battery's DC-DC converter to the DC bus when generated PV power is more than the load power and battery is fully charged. VIEC emulates an additional virtual capacitance in parallel with DC link capacitors. DC bus voltage fluctuations are significantly reduced by the VIEC emulating virtual capacitors.

18 Claims, 16 Drawing Sheets

(56) References Cited

U.S. PATENT DOCUMENTS

2022/0385066 A1\* 12/2022 Tanaka .................... H02J 3/007
2023/0216308 A1    7/2023 Khan et al.

FOREIGN PATENT DOCUMENTS

| CN | 107834602 A | 3/2018 |
|----|-------------|--------|
| CN | 105897013 B | 4/2018 |
| CN | 108599263 A | 9/2018 |
| CN | 109698495 A | 4/2019 |
| CN | 110212515 A | 9/2019 |
| CN | 108832612 B | 4/2020 |
| CN | 111327041 B | 12/2023 |

OTHER PUBLICATIONS

ISR and Written Opinion, PCT/CN2024/132093, Aug. 18, 2025.

\* cited by examiner

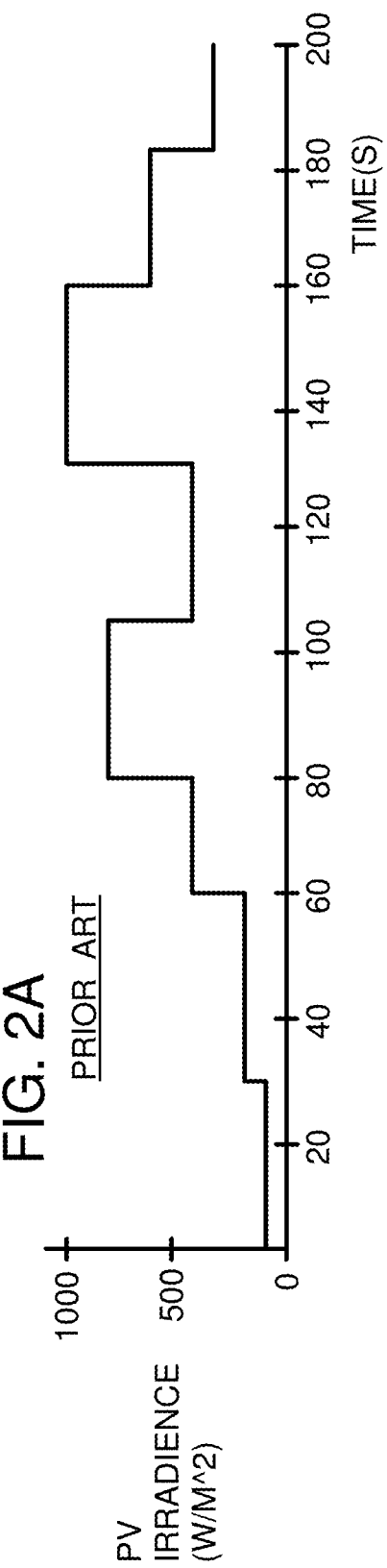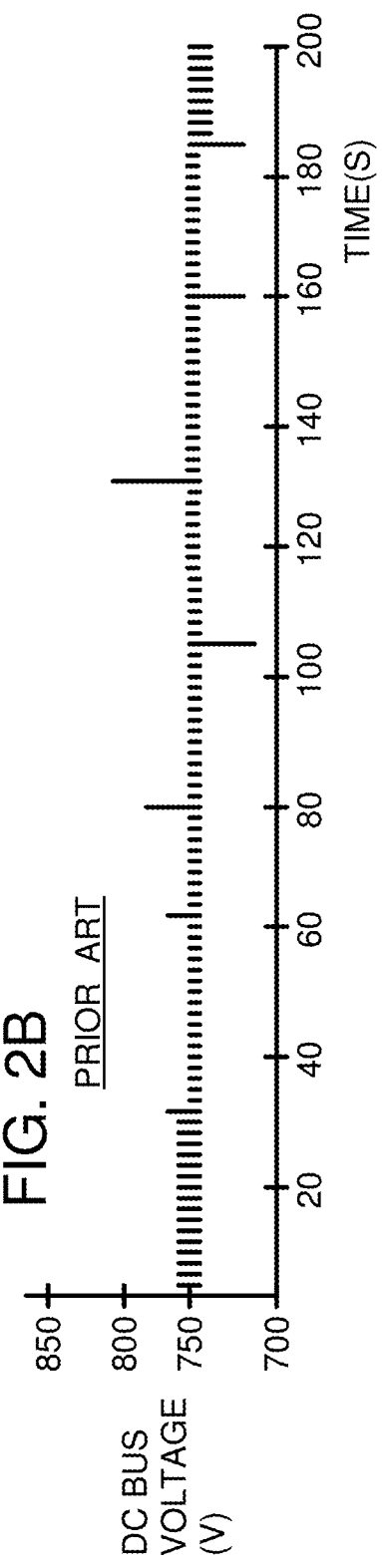

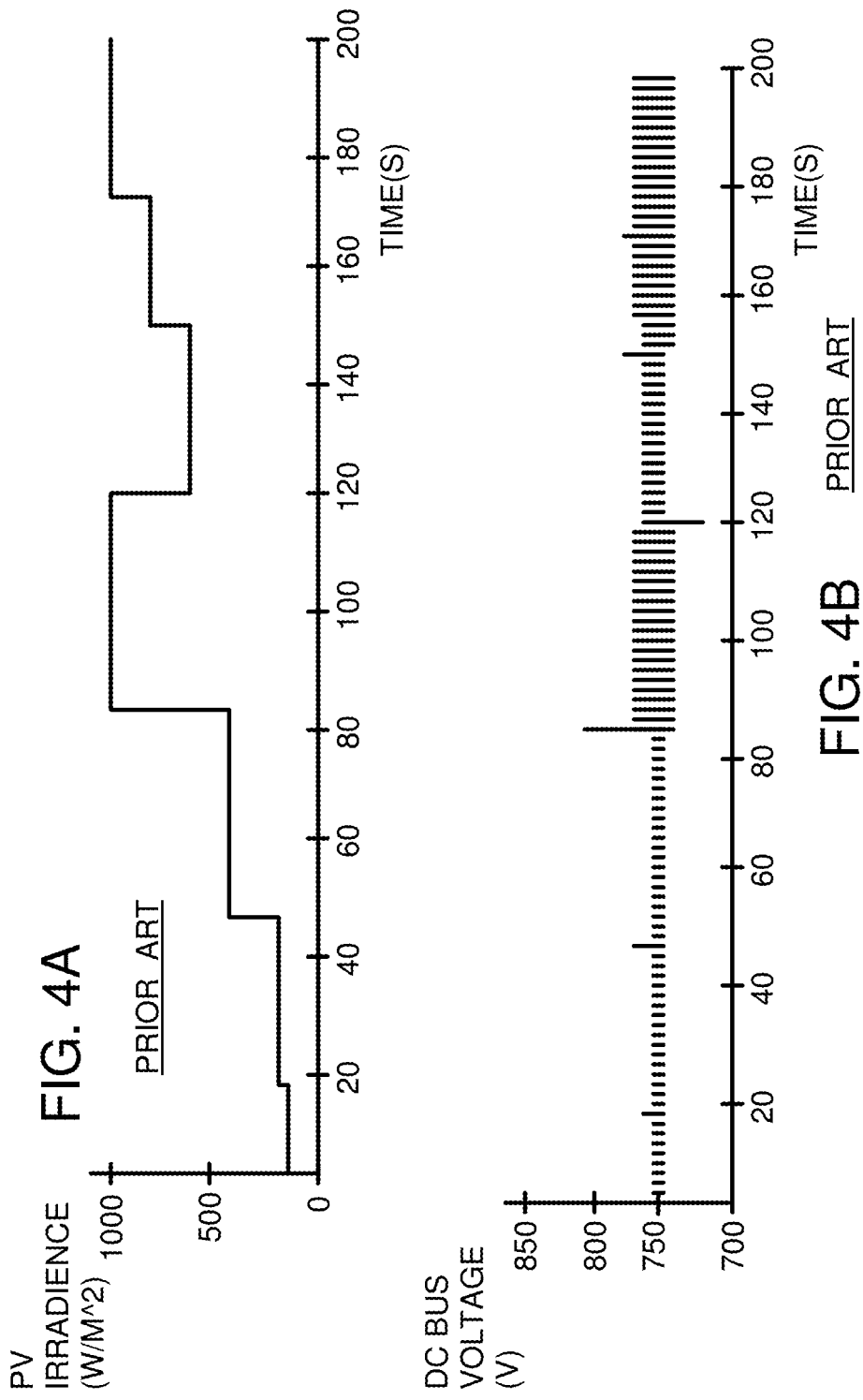

VIEC BATTERY + PV (MODE 3)

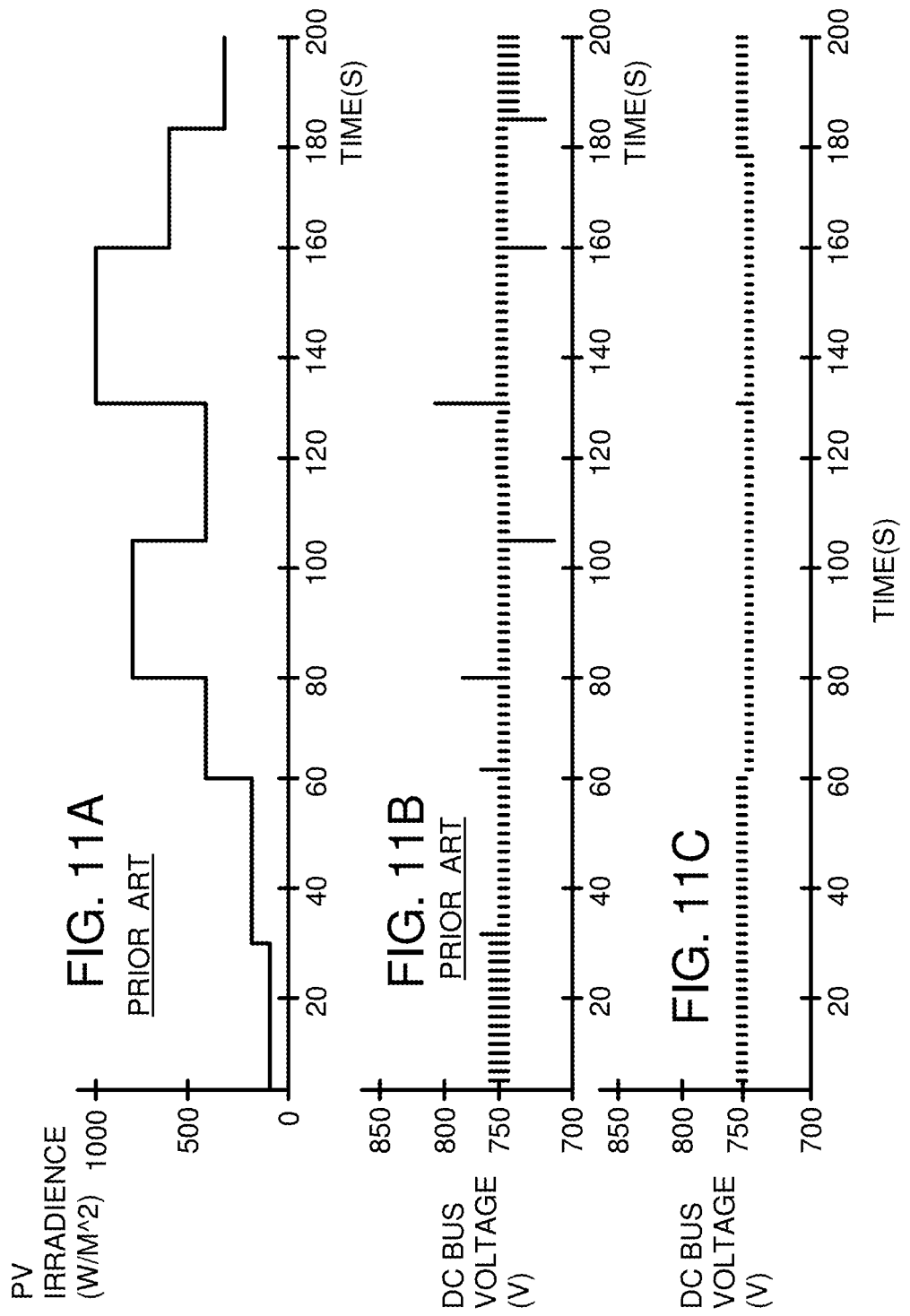

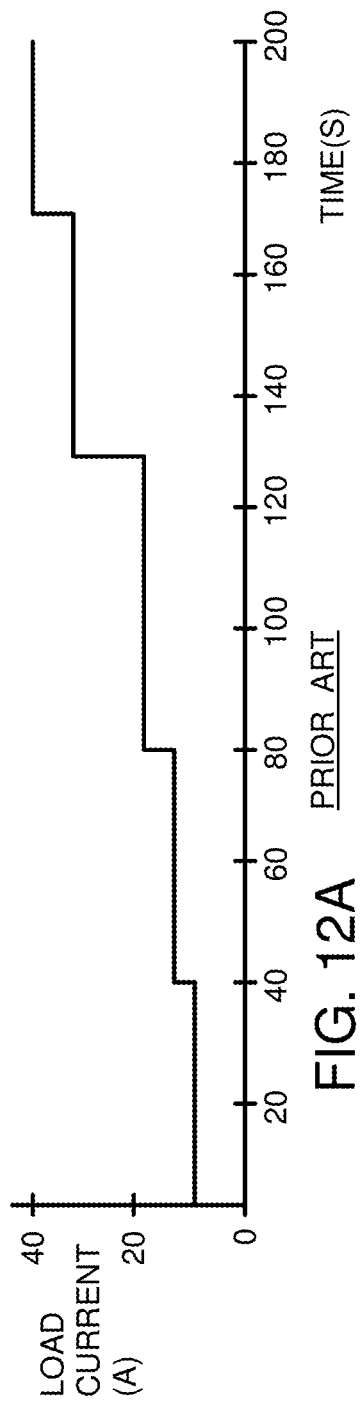
FIG. 12A _PRIOR ART_
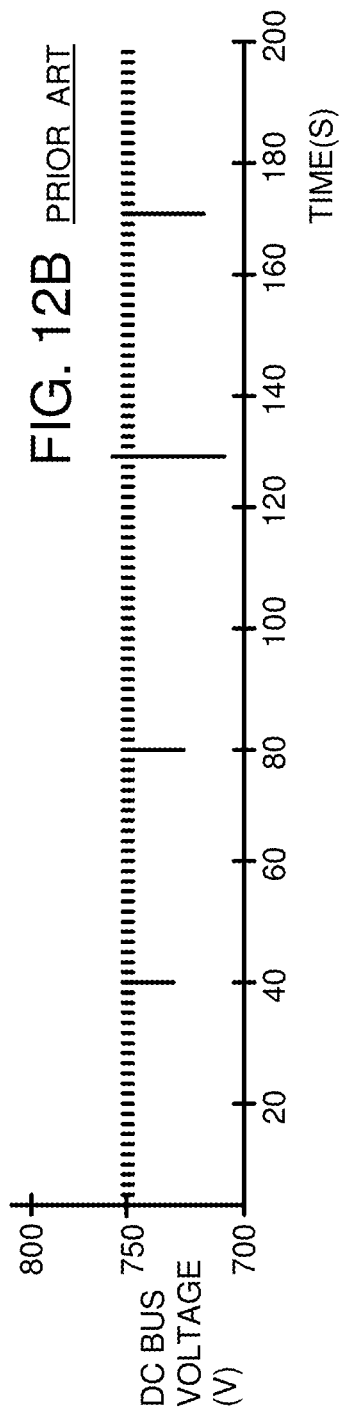
FIG. 12B _PRIOR ART_
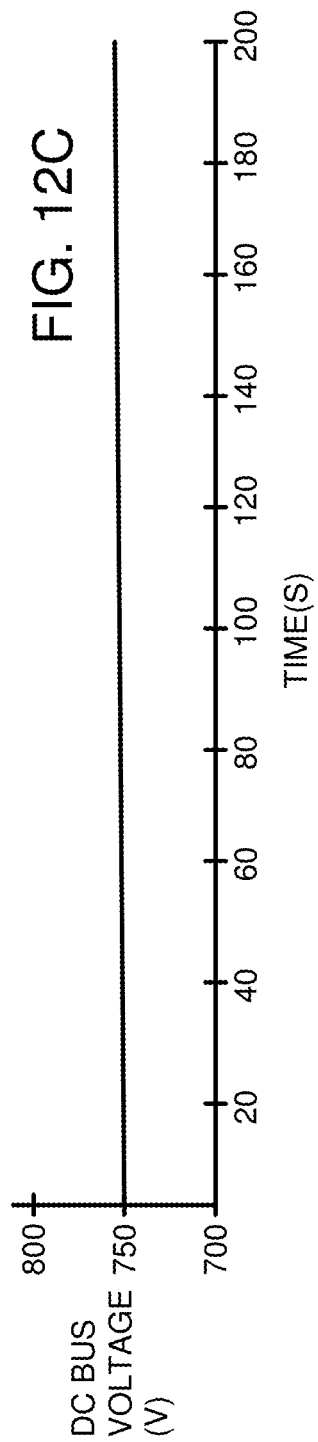
FIG. 12C

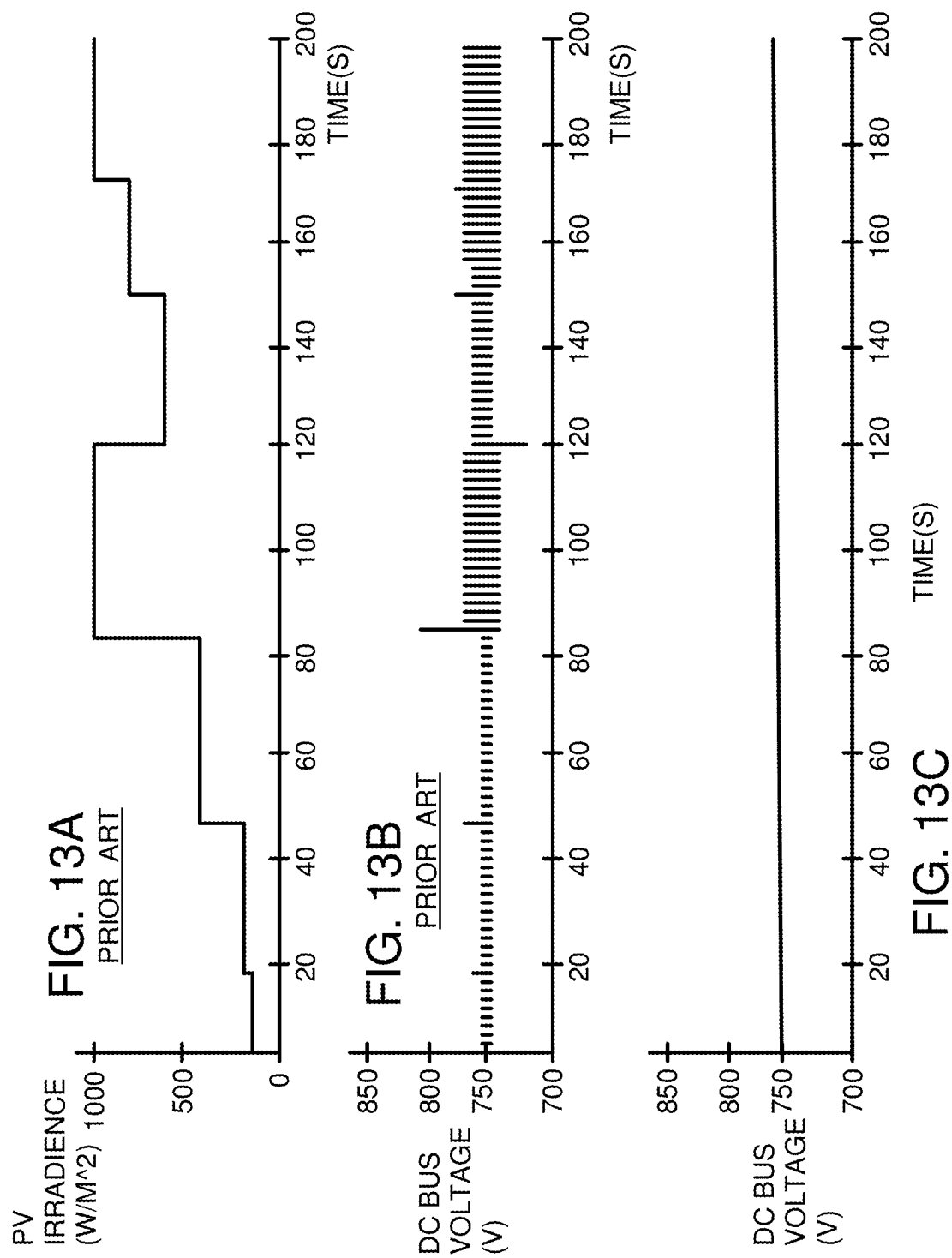

DISTRIBUTED INERTIA-ENHANCEMENT CONTROL METHOD OF THE DC-BUS VOLTAGE OF A LOW-INERTIA DC MICROGRID

FIELD OF THE INVENTION

This invention relates to low-inertia DC microgrids for renewables, and more particularly to distributed inertia control using DC-DC converters on the microgrid.

BACKGROUND OF THE INVENTION

Electric power has traditionally been delivered by large utility companies to thousands of customers tied together by the utility's electric grid. The large size of the grid helps to provide stable voltages to customers. When loads are switched on or off, voltage fluctuations are diminished due to the inertia of the grid.

More recently renewable energy generation has been added to power grids. Photovoltaic (PV) solar panels have much less inertia since the energy generated fluctuates with the sunlight, especially when clouds pass through. Battery storage systems have also been added to store energies from renewables for use later in the day when sunlight diminishes.

Climate change has worsened utility disruptions such as from hurricanes and wildfires. The electric grid can be down for days after a hurricane. Utilities may preemptively shut down power lines during wind events to prevent powerlines from sparking a new wildfire. Some customers are building their own microgrids that can disconnect from the utility grid and deliver power even when these disruptions occur.

A factory, residential building area, or a small territory may have its own microgrid that is powered from its own renewables such as solar array, and install battery storage on its microgrid to store power for later use. Microgrids that can isolate themselves from the utility grid are known as islanded microgrids. Islanded microgrids are local grids with their own power generation and back up units and operate isolated from the utility grid.

While utility grids generate and provide Alternating Current (AC) power, some microgrids generate and provide Direct Current (DC) power. For example, a DC microgrid may have a solar panel array that converts the solar power to 750 volt DC that is carried by power lines within the microgrid. A town with its own microgrid may have 750-volt DC powerlines on power poles that is delivered to customers' homes, where DC voltage conversion is performed for DC loads or it is converted to AC for use by standard AC appliances.

FIG. 1 shows a prior art low-inertia DC microgrid. DC bus 10 is isolated from the AC grid and is subject to voltage fluctuations that are undesirable, especially for a public DC bus. Solar panels in photovoltaic (PV) array 20 generate DC power from sunlight, and provides current IPV and voltage VPV to DC-DC converter 22. DC-DC converter 22 is a Switched-Mode Power Supply (SMPS) to provide generation power PG to DC bus 10. Output capacitor 24 near DC-DC converter 22 is responsible for regulating the output voltage and minimizing the ripple.

Switching signal SPV of the power semiconductors in DC-DC converter 22 are provided by PV controller 41. Maximum Power Point Tracking (MPPT) 49 examines current IPV and voltage VPV of PV array 20 and tracks the power (IPV×VPV) generated by PV array 20. MPPT 49 can adjust the power drawn from PV array 20 by DC-DC converter 22 by adjusting control signal DPV to Pulse Width Modulation (PWM) 48 that generates pulses on switch signal SPV to the power semiconductors. For example, the pulse with of SPV can be adjusted by PWM generator 48 to allow more power to flow from PV array 20 to DC bus 10, increasing the power PG connecting to the DC bus. MPPT can also periodically scan across a range DPV values to cause DC-DC converter 22 to draw varying current IPV, and the measured voltage VPV, to track the power IPV*VPV, and then selecting a DPV value producing the maximum power.

Battery 30 can be charged from DC bus 10 or can discharge to the DC bus with bidirectional current IB for inflow/outflow of power PB to/from DC bus 10. Bi-directional DC-DC converter 32 interfaces battery voltage VB to the DC bus voltage 10, VDC. Battery controller 150 generates switching signal SB for the power semiconductors in DC-DC converter 32. DC bus voltage controller 54 compares a reference voltage VDCREF to DC bus voltage VDC 10 to generate current reference IBREF. Current controller 56 compares IBREF to battery current IB to generate control DB to PWM 58, which generates switching signal SB and adjusts their pulse widths in response to DB.

FIGS. 2A-2B are graphs showing simulation results of DC bus voltage fluctuations of a low-inertia DC microgrid due to changes in solar irradiation. In FIG. 2A, the solar radiation falling on a PV solar panel varies with the time of day, and as clouds block sunlight. In FIG. 2B, when solar irradiance changes, the DC bus voltage of the microgrid being powered by the PV panels is overshoot or undershoot up to 7%.

FIGS. 3A-3B are graphs showing simulation results of DC bus voltage fluctuations of a low-inertia DC microgrid due to loading changes. In FIG. 3A, the load current drawn from the microgrid varies over time. When the load suddenly switches to a higher load current, the DC bus voltage has a more undershoot. These voltage drops can be as much as 6 to 14% of nominal DC bus voltage as shown in FIG. 3B.

FIGS. 4A-4B are graphs showing simulation results of DC bus voltage fluctuations on a microgrid due to changes in solar irradiation and loading. In FIG. 4A, the solar radiation falling on a PV solar panel varies with the time of day, and as clouds block sunlight. FIG. 4B shows the combined effect of solar irradiance and loading changes on the DC bus voltage. The DC bus voltage can have fluctuations as much as 6% to 14%.

The DC bus voltage fluctuations are undesirable as they can cause power semiconductors failures in DC-DC converters, fast decay of battery life, and load shedding.

FIGS. 5A-5B are diagrams illustrating the principal of virtual inertia enhancement control. FIG. 5A shows the equivalent circuit of a DC machine. The DC machine is rotated with an angular velocity (@) by a prime mover with a moment of inertia (J). Due to electromagnetic induction, the voltage induced across the armature is EA and IA is the current flowing through the armature winding (shown as inductor and resistor). VT is the terminal voltage of the DC machine. The speed of the DC machine can be controlled through its inertia characteristics.

FIG. 5B shows a half-bridge based DC-DC converter circuit. An input supply voltage VIN is to be converted to an output supply voltage VOUT. A common ground GND is used for both input and outputs, but some systems have separate grounds.

Power inductor 314 is in series with resistor 312 between VIN and the source of high-side power semiconductor 302. The source of high-side power semiconductor 302, the drain of low-side power semiconductor 304, and one side of resistor 312 are connected together at the switching node.

The gate G1 of high-side power semiconductor 302 is driven high to turn on the power semiconductor 302 for a period of time (denoted as (1−D)*Ts, where D is duty cycle and Ts is the switching period) to connect VIN in series with power inductor 314 for provide a boosted DC output voltage VOUT, while output capacitor 320 is for regulating VOUT and minimize the VOUT ripple. Once G1 is driven low, the gate of low-side power semiconductor 304 is driven high to charge up the power inductor. The signals for G1, G2 are typically complementary clocks in the kHz frequency range, and the duty cycles are adjusted to obtain the desired output voltage VOUT for a particular input voltage VIN. For example, by increasing the duty cycle for G2 relative to that of G1, a higher VOUT could be obtained.

Output capacitor 320 with capacitance CDC filters the output to provide a more constant output voltage VOUT (or VDC). Node P is the connection point for output capacitor 320, with current IDC entering node P and output current IOUT exiting node P, with the difference IOUT-IDC being the current flowing into output capacitor 320.

Power semiconductors 302, 304 could be n-channel silicon-based Metal-Oxide-Semiconductor Field-Effect Transistors (MOSFET), but more recently silicon carbide (SiC) or Gallium-Nitride (GaN) based power semiconductors are being used since they can supply a much higher current for a given physical transistor size with an improved electrical and thermal performance What is desired is enhanced inertia for a DC microgrid that is not currently connected to a utility grid. A low-inertia DC microgrid that has a more stable DC bus voltage is desired without simply adding large capacitors. A controller for a DC-DC converter is desired that emulates the mechanical inertia characteristics of a DC machine through a virtual capacitor which absorbs or supports the amount of power imbalance when DC bus voltage fluctuations occur. A Virtual Inertia Enhancement Controller (VIEC) for a DC-DC converter is desired to enhance the inertia of islanded or low-inertia DC micro grids virtually by adjusting the pulse widths (i.e., duty cycle) of switching signals to power semiconductors in the SMPS. It is further desired to add VIEC to DC-DC converters for both battery storage and for PV generation to provide distributed inertia control for a low-inertia DC bus microgrid.

BRIEF DESCRIPTION OF THE DRAWINGS

FIGS. 2A-2B are graphs showing simulation results of DC bus voltage fluctuations of a low-inertia DC microgrid due to changes in solar irradiation.

FIGS. 4A-4B are graphs showing simulation results of DC bus voltage fluctuations of a low-inertia DC microgrid due to changes in solar irradiation and loading.

FIGS. 11A-11C are graphs showing simulation results of DC bus voltage fluctuations of a low-inertia DC microgrid due to changes in solar irradiation with and without VIEC.

FIGS. 12A-12C are graphs showing simulation results of DC bus voltage fluctuations of a low-inertia DC microgrid due to loading changes with and without VIEC.

FIGS. 13A-13C are graphs showing a simulation results of DC bus voltage fluctuations of a low-inertia DC microgrid due to changes in solar irradiation and loading, with and without VIEC.

DETAILED DESCRIPTION

The present invention relates to an improvement in the control of DC-DC converters for providing enhanced virtual inertia to low-inertia DC microgrids. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors desire to increase the inertia of a low-inertia DC microgrid. The inertia can be increased by increasing de bus capacitance by placing large capacitors on the DC bus, but this is undesirable. Instead, the inventors emulate the inertia characteristic of a DC machine through control of DC-DC converter which helps to increase the de link capacitance virtually.

Figure 1:
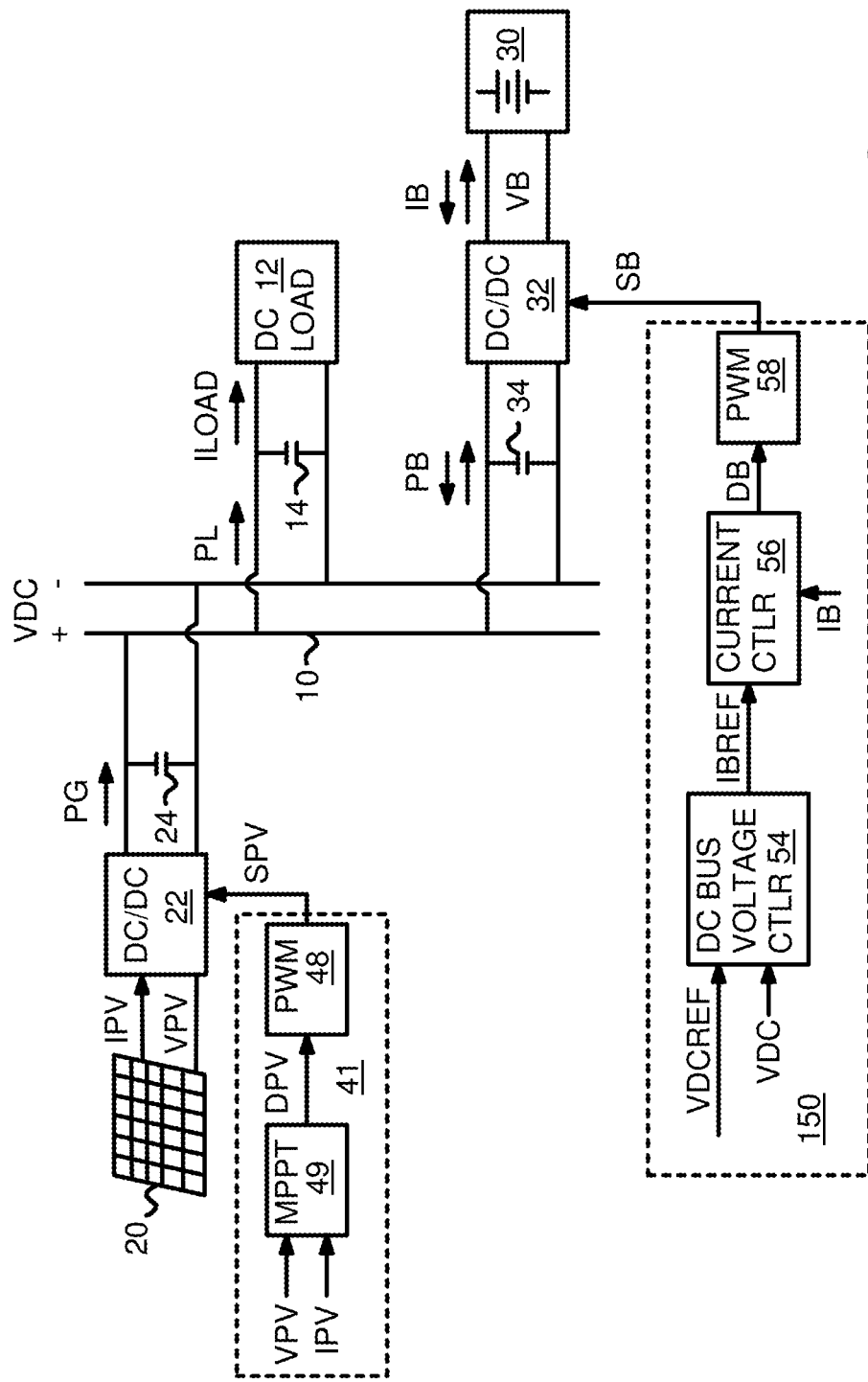
FIG. 1 shows a prior art low-inertia DC microgrid.
Figure 3A:
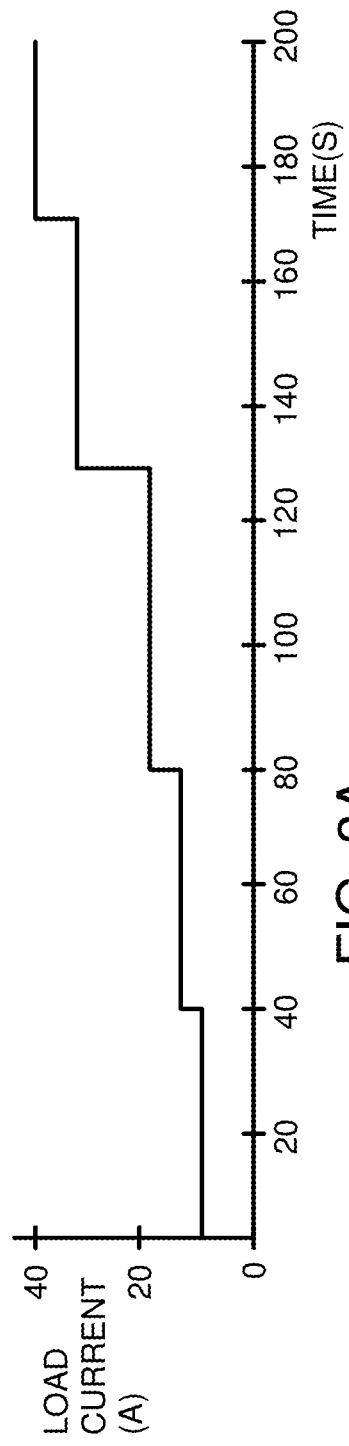
FIGS. 3A-3B are graphs showing simulation results of DC bus voltage fluctuations of a low-inertia DC microgrid due to loading changes.
Figure 3B:
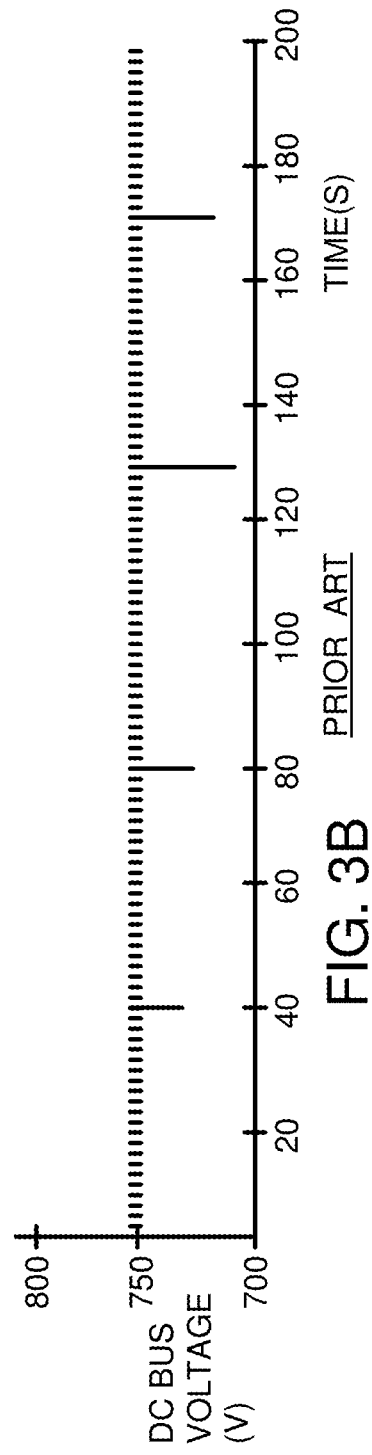
Figures 5A, 5B:
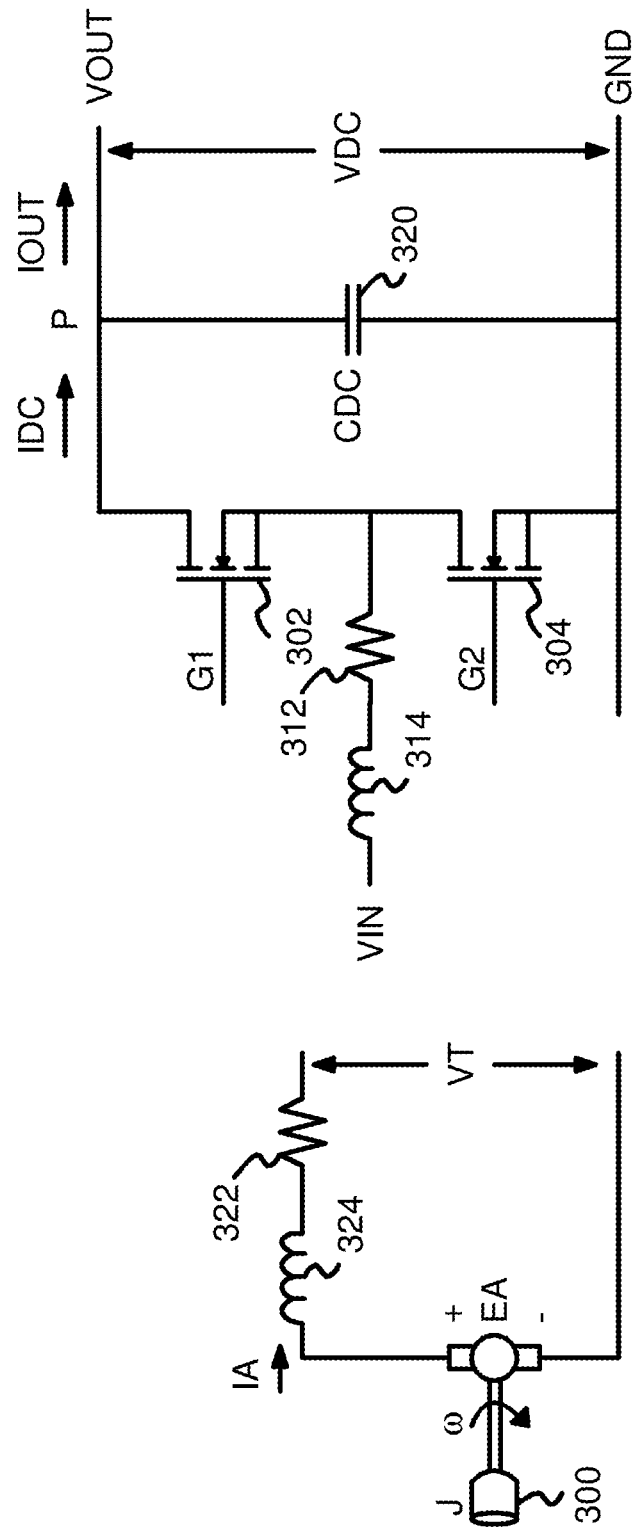
FIG. 5A is a diagram of an equivalent circuit of a DC machine.
FIG. 5B shows a half-bridge based DC-DC converter circuit of a SMPS.

The DC machine of FIG. 5A has a mechanical DC machine equation:

$$T_m - T_e - D(\omega - \omega_r) = J\frac{d\omega}{dt}$$

Applying Kirchoff's current law to node P of the DC-DC converter of FIG. 5B produces the equation:

$$i_{dc} - i_{out} - G_{dc}(v_{dc} - V_{dcnom}) = C_{dc}\frac{dv_{dc}}{dt}$$

The inventors realize that these equations are analogous. In particular:

The moment of inertia (J) in the DC machine of FIG. 5A is analogous to the DC bus capacitance ($C_{dc}$) of the DC-DC converter of FIG. 5B.

Damping factor (D) (FIG. 5A) corresponds to parasitic conductance ($G_{dc}$), (FIG. 5B).

Angular velocity (ω) corresponds to DC bus voltage ($V_{dc}$).

The mechanical torque ($T_m$) corresponds to the DC bus output current ($i_{dc}$).

The electrical torque ($T_e$) of FIG. 5A corresponds to the DC bus input current ($i_{out}$) of FIG. 5B.

The inventors realize that the DC bus capacitance ($C_{dc}$) of the DC-DC converter can be increased to increase the inertia of a DC bus voltage of an islanded or low-inertia DC micro grid, similar to how the moment of inertia (J) in the DC machine of FIG. 5A provides inertia of a DC machine due to a spinning turbine or rotor. The inventors realize that increasing DC bus capacitance ($C_{dc}$) can increase inertia of the DC bus.

However, rather than using a larger output capacitor 320 (FIG. 5B), the inventors increase DC bus capacitance ($C_{dc}$) virtually. This virtual capacitance $C_{vir}$ can be thought of as being added to the physical output capacitor ($C_{dc}$) for a total capacitance of $C_{vir}+C_{dc}$.

For example, when there is a sudden change of loading, the energy stored in the dc link capacitor supports the change in load power during that transient period according to the equation:

$$\Delta P_1 = (C_{vir} + C_{dc})v_{dc}\frac{dv_{dc}}{dt}$$

The rate of change of DC bus voltage can be reduced by increasing the value of the virtual capacitor $C_{vir}$.

The Virtual Inertia Enhancement (VIE) equation, generated by applying Kirchhoff's Current law to the node that the DC link capacitor of the DC-DC converter is connected, is:

$$i_{load1} - i_{dc1} - G_{dc}(v_{dcref} - V_{dcnom}) = C_{vir}\frac{dv_{dcref}}{dt}$$

This VIE equation can be implemented as a Virtual Inertia Enhancement Controller (VIEC).

Figure 6:
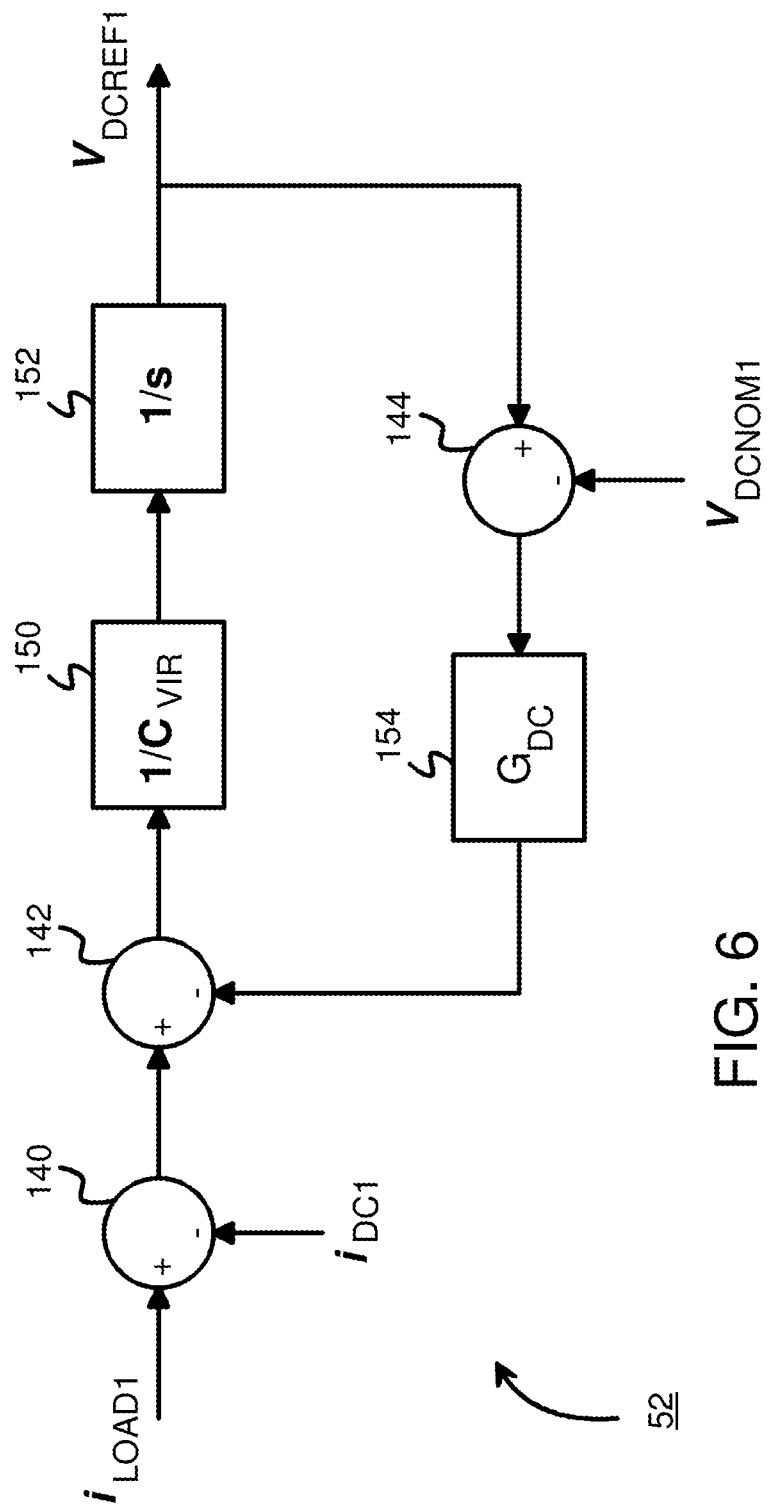
FIG. 6 shows a Virtual Inertia Enhancement Controller (VIEC).

FIG. 6 shows a Virtual Inertia Enhancement Controller (VIEC). VIEC 52 implements the VIE equation (above).

DC load current IDC1 is subtracted from load current ILOAD1 by adder 140. Adder 144 subtracts nominal DC voltage VDCNOM1 from reference DC voltage VDCREF1, and the difference is multiplied by DC conductance GDC by multiplier 154, and the product is subtracted by adder 142 from the difference from adder 140. The result from adder 142 is:

$$i_{load1} - i_{dc1} - G_{dc}(v_{dcref1} - V_{dcnom1})$$

which is the left side of the VIE equation.
The right side of the VIE equation is:

$$C_{vir}\frac{dv_{dcref}}{dt}$$

Next, the reciprocal of the desired virtual capacitance CVIR is multiplied by both sides of the VIE equation. Multiplier 150 performs this multiplication of the left side of the VIE equation by 1/CVIR. Then Laplace transformation is performed to integrate $$\frac{dv_{dcref}}{dt}$$

to get the DC reference voltage VDCREF1.

VIEC 52 outputs DC reference voltage VDCREF1, which will be used to control the DC-DC converter.

Like the moment of inertia J in the DC machine of FIG. 5A, DC bus capacitance $C_{dc}$ in the DC-DC converter acts as an inertia constant for DC bus voltage fluctuations. DC bus capacitance $C_{dc}$ can be increased virtually through a control method called Virtual Inertia Enhancement Control (VIEC). VIEC controls the DC bus voltage fluctuations by controlling the DC-DC converter.

Figure 7:
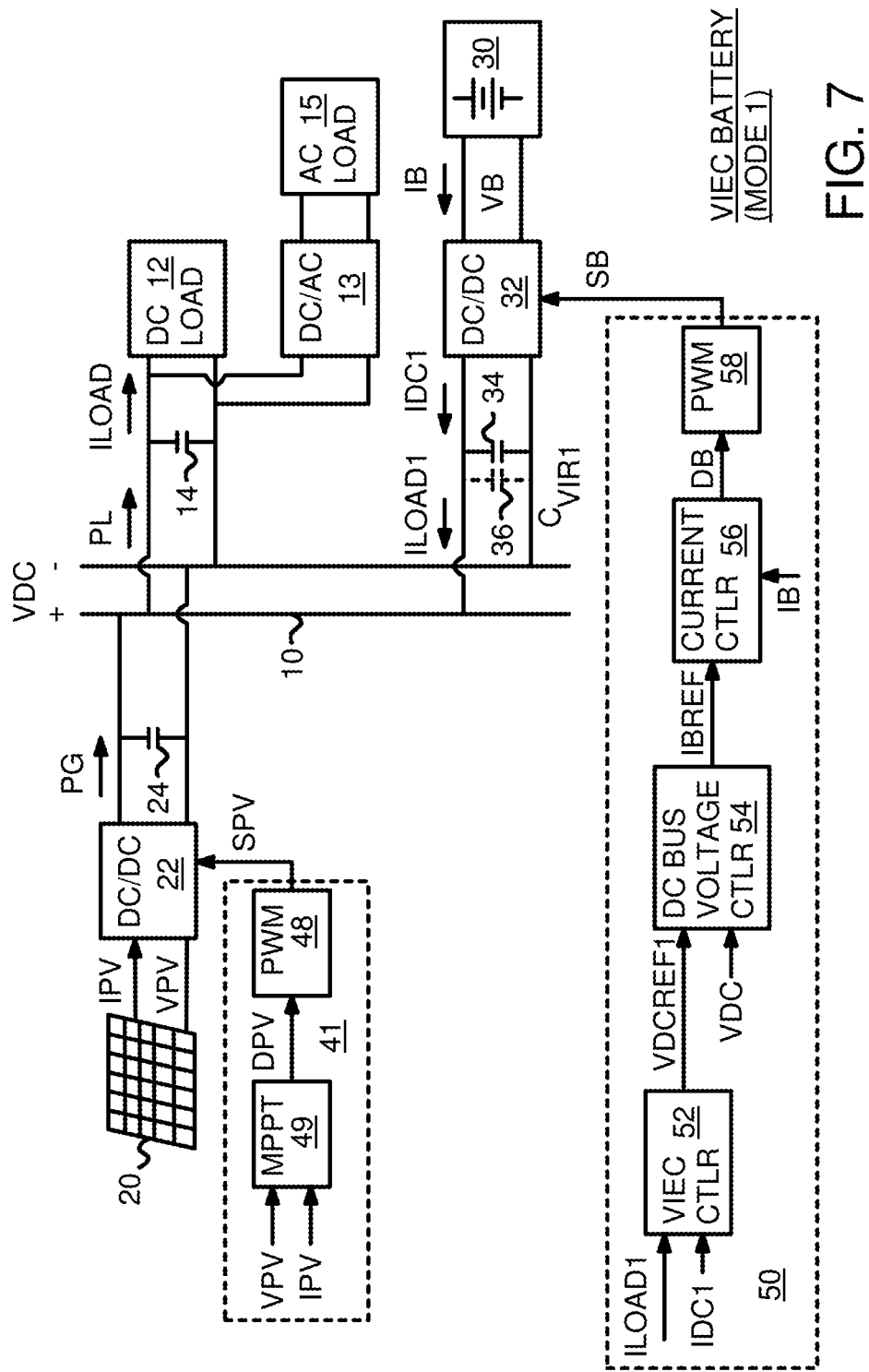
FIG. 7 shows a low-inertia DC microgrid with a Virtual Inertia Enhancement Controller (VIEC).

FIG. 7 shows a low-inertia DC microgrid with a Virtual Inertia Enhancement Controller (VIEC) implemented on the battery 30 interfacing DC-DC converter 32 to control the DC bus voltage 10.

Battery controller 50 uses VIEC 52 to generate switching signal SB for the power semiconductors in DC-DC converter 32. VIEC 52 compares current IDC1 from the output of DC-DC converter 32 with current ILOAD1 flowing into DC bus. In steady state, these currents should be equal, but when they mismatch, voltage fluctuations occur on DC bus 10. For example, when there is a sudden increase in loading, ILOAD1 increases causing DC bus voltage to fluctuate. Through VIEC 52, the stored energy in the DC link capacitor is instantly used to support the extra load power requirements without disturbing the DC bus voltage. Virtual capacitor 36 (Cvir1) is emulated through VIEC 52 to provide virtual inertia to DC bus voltage 10. VIEC 52 generates the reference voltage VDCREF1 for DC bus voltage controller 54. In steady state, battery 30 supplies more current IB to support the extra load requirement.

DC bus voltage controller 54 compares a reference voltage VDCREF1 from VIEC 52 to bus voltage VDC of DC bus 10 to generate current reference IBREF. Current controller 56 compares IBREF to battery current IB to generate control signal DB to PWM 58, which generates switching signal SB and adjusts their pulse widths controlling power semiconductors.

DC bus 10 is isolated from the AC grid and is subject to voltage fluctuations that are undesirable. Solar panels in photovoltaic (PV) array 20 generate DC power from sunlight, and provides current IPV and voltage VPV to DC-DC converter 22. DC-DC converter 22 is a SMPS that has power semiconductors that are switched on and off at the order of magnitude of tens kHz to provide generation power PG to DC bus 10. Output capacitor 24 near DC-DC converter 22 smooths the ripple caused by switching and regulates the output voltage concurrently.

The switching signal SPV of the power semiconductors in DC-DC converter 22 are provided by PV controller 41. MPPT 49 examines current IPV and voltage VPV of PV array 20 and tracks the power (IPV×VPV) generated by PV array 20. MPPT 49 can adjust the power drawn from PV array 20 by DC-DC converter 22 by adjusting control signal DPV to PWM generator 48 that generates PWM signal SPV to the power semiconductors. For example, PWM 48 can increase the duty ratio of power semiconductors to increase the output voltage to DC bus 10. MPPT 49 can also continuously scan across a range of DPV values to cause DC-DC converter 22 to draw higher and lower values of current IPV, and then measure voltage VPV, tracking the power IPV*VPV, and then selecting a DPV value that produces the maximum power.

Load power PL is provided from DC bus 10 to DC load 12, which can be a DC powered device. DC/AC converter 13 converts DC to AC for use by AC load 15, which can include common household appliances. Capacitor 14 is provided across the load to smooth the ripple in the DC bus voltage and regulate the output voltage. Load power PL includes power to DC load 12 and power to AC load 15.

FIG. 7 shows mode 1, where DC-DC converter 32 for battery 30 implements Virtual Inertia Enhancement (VIE). However, VIE may be implemented on other DC-DC converters on the DC microgrid. In mode 2, DC-DC converter 22 for PV array 20 implements VIE instead. In mode 3, VIE is implemented on both PV and battery DC-DC converters.

These control modes are determined through generated (PG) and loading (PL) power levels ($P_g$, $P_l$) and the State of Charge (SOC) of the battery.

Figure 8A:
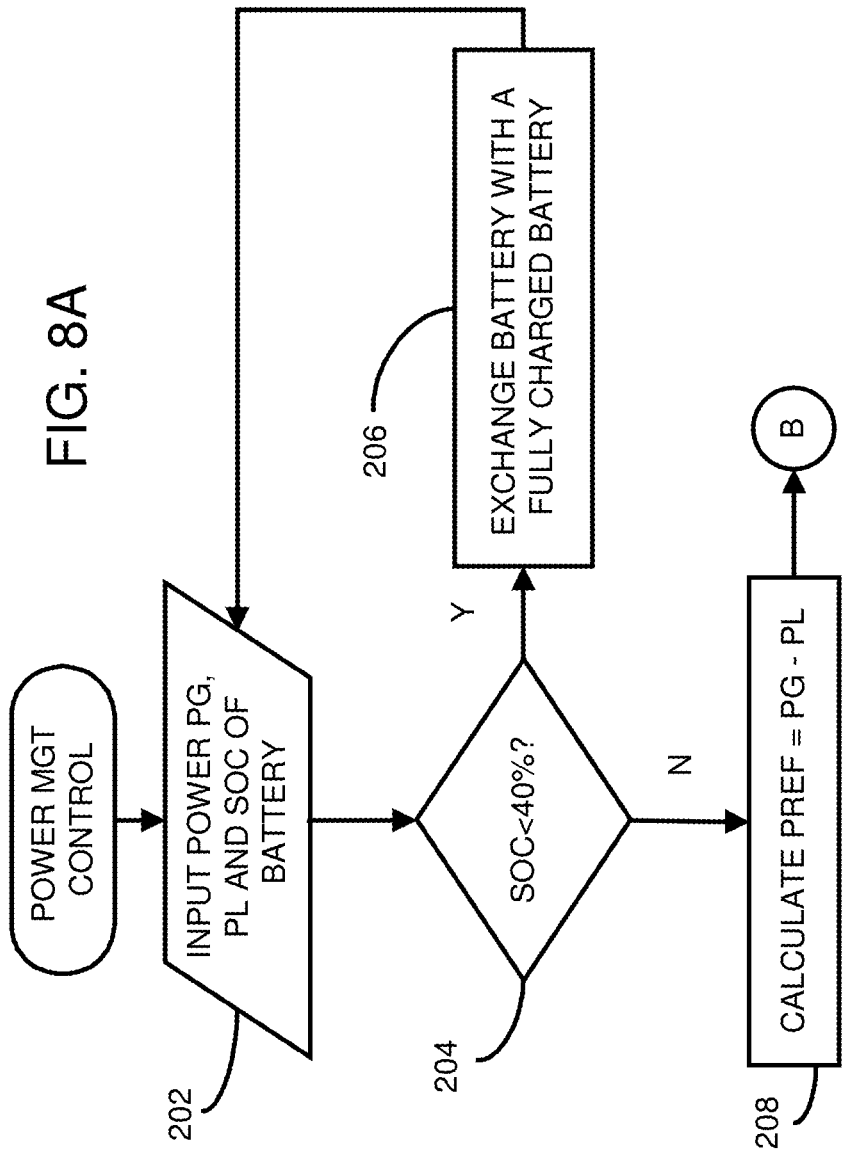
FIGS. 8A-8B show a flowchart for selecting a DC-DC converter to implement VIEC for three control modes.
Figure 8B:
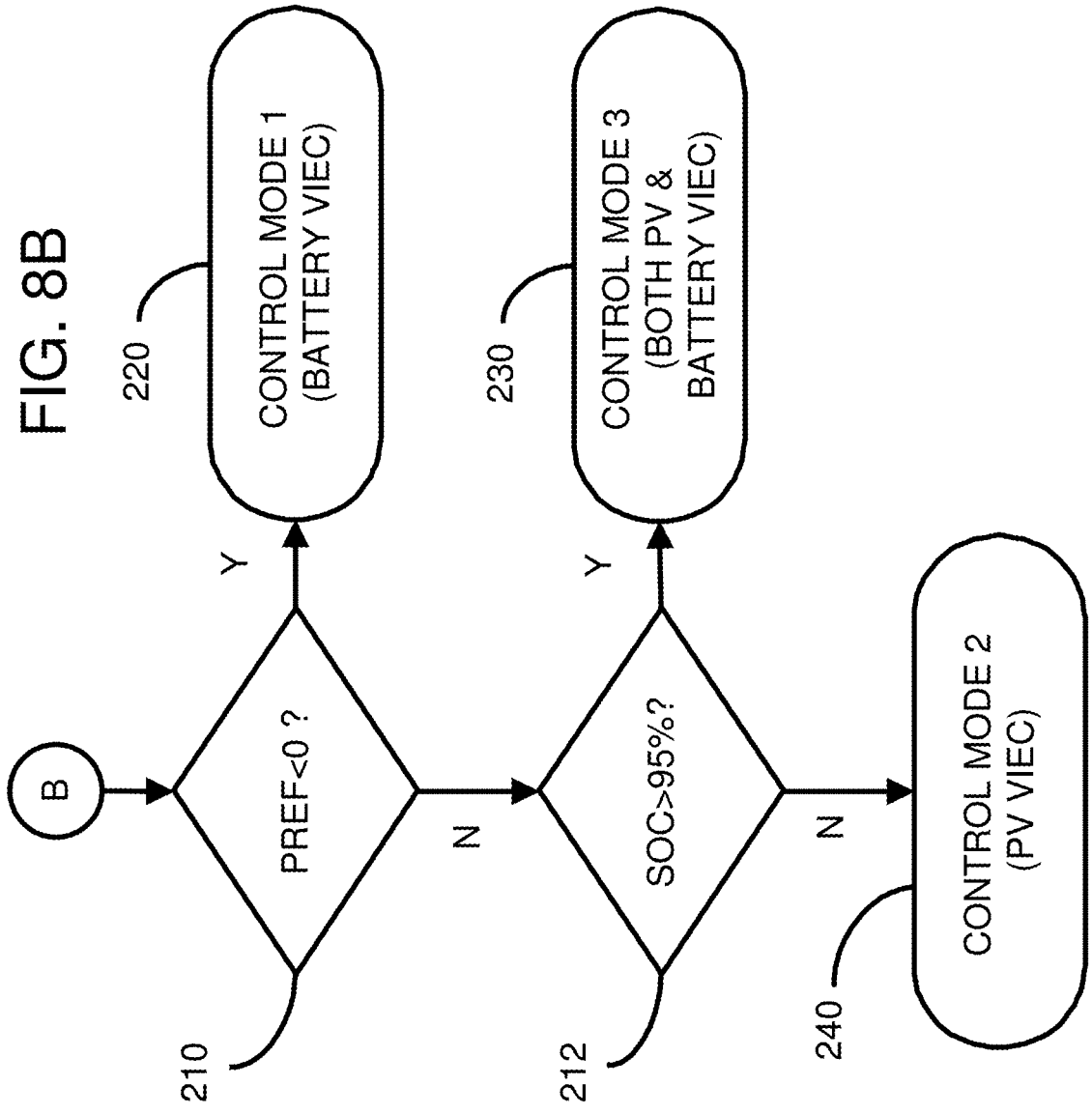

FIGS. 8A-8B show a flowchart for selecting a DC-DC converter to implement VIEC for three control modes. In FIG. 8A, the generated power PG, the load power PL, and the SOC of battery 30 are input, step 202. When the battery SOC is less than 40%, step 204, then battery 30 is exchanged for a freshly charged battery, step 206, and the process repeated from step 202.

Reference power PREF is calculated by subtracting load power PL from generated power PG, or PREF=PG−PL, step 208.

In FIG. 8B, when PREF is negative, i.e., when load power exceeds generated power, step 210, then control mode 1 is activated, step 220. VIEC is implemented on the battery's DC-DC converter.

When PREF is positive, i.e., when generated power exceeds load power, step 210, and the battery SOC is greater than 95%, step 212, then control mode 3 is activated, step 230. VIEC is implemented both on the battery's DC-DC converter and on the PV DC-DC converter.

When PREF is positive, i.e., when generated power exceeds load power, step 210, and the battery SOC is not above 95%, step 212, then control mode 2 is activated, step 240. VIEC is implemented on the PV DC-DC converter.

Figure 9:
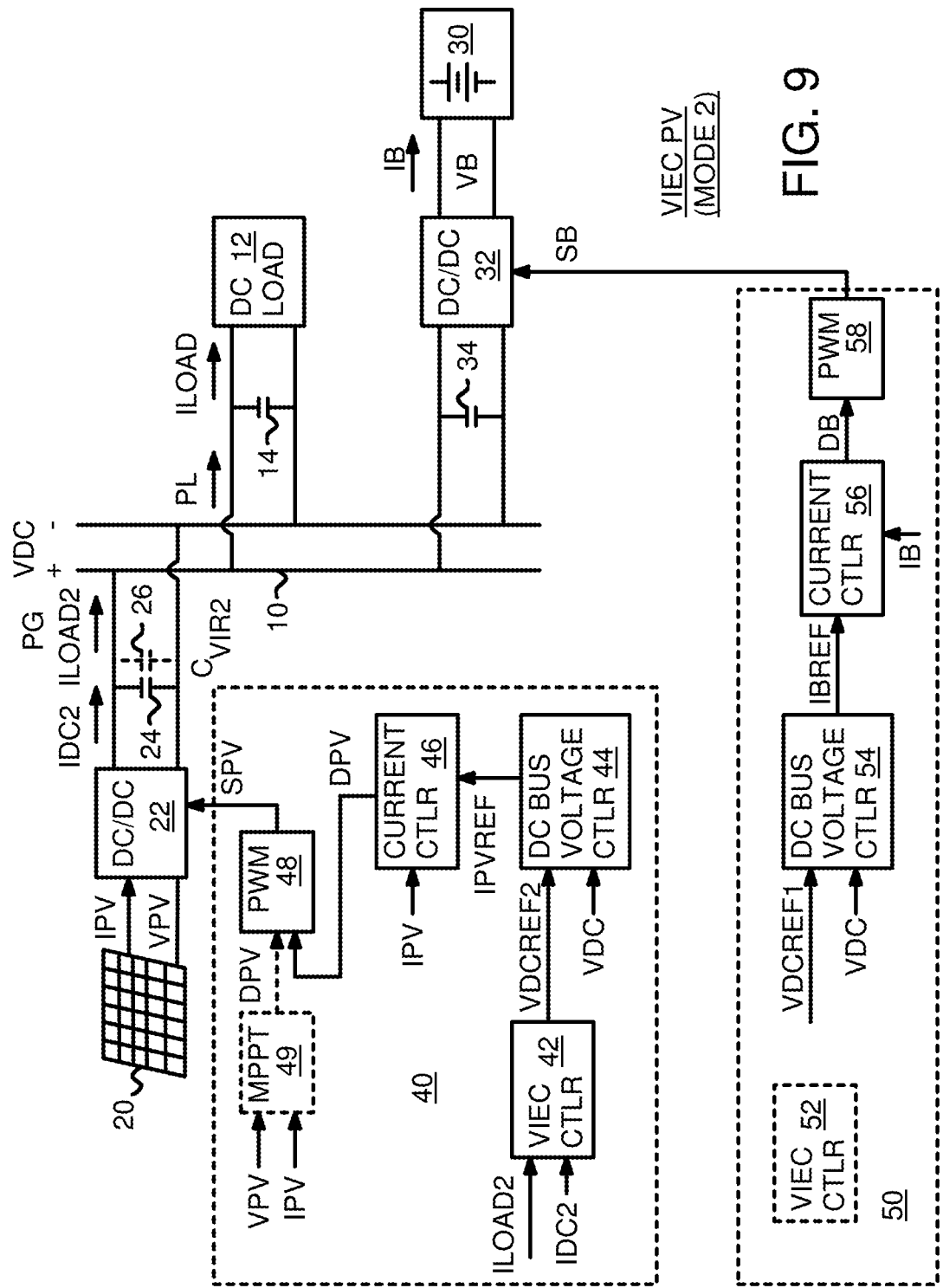
FIG. 9 shows a low-inertia DC microgrid with a Virtual Inertia Enhancement Controller (VIEC) implemented for the PV DC-DC converter.

FIG. 9 shows a low-inertia DC microgrid with a Virtual Inertia Enhancement Controller (VIEC) implemented for the PV DC-DC converter. This is mode 2.

PV controller 40 uses VIEC 42 to generate switching signal SPV for the power semiconductors in DC-DC converter 22. VIEC 42 compares current IDC2 from the output of DC-DC converter 22 with current ILOAD2 flowing into DC bus 10. In steady state, these currents should be equal, but when they mismatch, voltage fluctuations occur on DC bus 10. For example, when there is a sudden increase of PV power, IDC2 increases causing the DC bus voltage to fluctuate. Through VIEC 42, the extra power generated instantly get stored in DC link capacitor 24 without disturbing the DC bus voltage. Virtual capacitor 26 (Cvir2) is emulated through VIEC 42 to provide virtual inertia to DC bus voltage 10. VIEC 42 generates reference voltage VDCREF2 for DC bus voltage controller 44.

DC bus voltage controller 44 compares reference voltage VDCREF2 from VIEC 42 to bus voltage VDC of DC bus 10 to generate current reference IPVREF. Current controller 46 compares IPVREF to PV current IPV to generate control DPV to PWM 48, which generates switching signal SPV and adjusts their pulse widths in response to DPV. In this mode, MPPT 49 is disabled.

Battery 30 can be charged from DC bus 10 with charging current IB. When there is a sudden increase in loading, battery 30 can be discharged to DC bus 10 via DC-DC converter 32. Battery controller 50 disables VIEC 52 in mode 2.

A stable or constant reference voltage VDCREF1 is applied to DC bus voltage controller 54. DC bus voltage controller 54 compares reference voltage VDCREF1 to bus voltage VDC of DC bus 10 to generate current reference IBREF. Current controller 56 compares IBREF to battery current IB to generate control DB to PWM 58, which generates switching signal SB and adjusts their pulse widths in response to DB.

DC bus 10 is isolated from the AC grid and is subject to voltage fluctuations that are undesirable. Solar panels in photovoltaic (PV) array 20 generate DC power from sunlight, and generate current IPV and voltage VPV to DC-DC converter 22. DC-DC converters 22, 32 are each a SMPS that has power semiconductors that are switched on and off to provide power to DC bus 10. Output capacitor 24 near DC-DC converter 22 smooths the ripple caused by switching and regulate the output voltage.

Load power PL is provided from DC bus 10 to DC load 12, which can be a DC powered device. Capacitor 14 is provided across DC load 12 to smooth the ripple in the DC bus voltage and regulate the output voltage.

Figure 10:
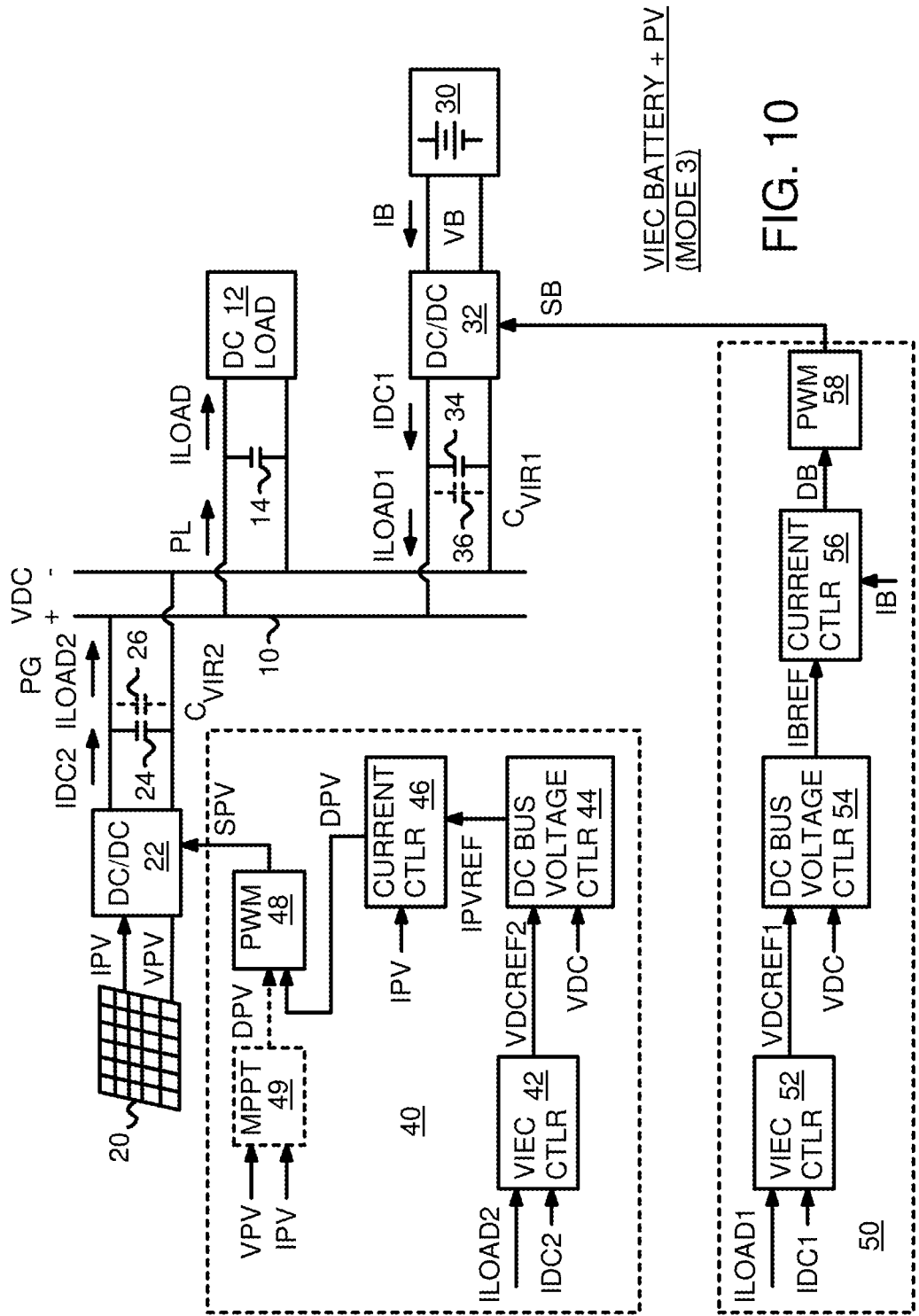
FIG. 10 shows a low-inertia DC microgrid with a Virtual Inertia Enhancement Controller (VIEC) implemented for both PV and battery DC-DC converters.

FIG. 10 shows a low-inertia DC microgrid with a Virtual Inertia Enhancement Controller (VIEC) implemented for both PV and battery DC-DC converters. This is mode 3.

PV controller 40 uses VIEC 42 to generate switching signal SPV for the power semiconductors in DC-DC converter 22. VIEC 42 compares current IDC2 from the output of DC-DC converter 22 with current ILOAD2 flowing into the DC bus 10. In steady state, these currents should be equal, but when they mismatch voltage fluctuations occurs on DC bus 10. For example, when there is a sudden increase of PV generated power, IDC2 increases causing DC bus voltage to fluctuate. Through VIEC 42, the extra power generated instantly get stored in the DC link capacitor without disturbing the DC bus voltage. Virtual capacitor 26 (Cvir2) is emulated through VIEC 42 to provide virtual inertia to DC bus voltage 10. VIEC 42 generates reference voltage VDCREF2 to DC bus voltage controller 44.

DC bus voltage controller 44 compares reference voltage VDCREF2 from VIEC 42 to bus voltage VDC of DC bus 10 to generate current reference IPVREF. Current controller 46 compares IPVREF to PV current IPV to generate control DPV to PWM 48, which generates switching signal SPV and adjusts their pulse widths in response to DPV. In this mode, MPPT 49 is disabled.

Battery 30 can be charged from DC bus 10 or can discharge with battery current IB to provide power to DC bus 10. DC-DC converter 32 converts battery voltage VB to the voltage of DC bus 10, VDC. The process is vice versa when the battery is charged from VDC to VB.

Battery controller 50 uses VIEC 52 to generate switching signal SB to the power semiconductors in DC-DC converter 32. VIEC 52 compares current IDC1 into capacitor 34 with current ILOAD1 out of capacitor 34. In steady state, these currents should be equal, but when they mismatch voltage fluctuations occur on DC bus 10. For example, when there is a sudden increase in loading, ILOAD1 increases causing DC bus voltage to fluctuate. Through VIEC 52, the stored energy in the DC link capacitor is instantly used to support the extra load power requirements without disturbing the DC bus voltage. Virtual capacitor 36 (Cvir1) is emulated through VIEC 52 to provide virtual inertia to DC bus voltage 10. VIEC 52 generates reference voltage VDCREF1 to DC bus voltage controller 54.

DC bus voltage controller 54 compares a reference voltage VDCREF1 from VIEC 52 to bus voltage VDC of DC bus 10 to generate current reference IBREF. Current controller 56 compares IBREF to battery current IB to generate control signal DB to PWM generator 58, which generates switching signal SB with desired duty cycle.

DC bus 10 is isolated from the AC grid and is subject to voltage fluctuations that are undesirable. Solar panels in photovoltaic (PV) array 20 generate DC power from sunlight, and generates current IPV and voltage VPV. DC-DC converter 22 is an SMPS that has power semiconductors that are switched on and off to provide generation power PG to DC bus 10. Output capacitor 24 near DC-DC converter 22 smooths the ripple caused by switching and regulate the output voltage.

Load power PL is provided from DC bus 10 to DC load 12, which can be a DC powered device. Capacitor 14 is provided across load to smooth the ripple in the DC bus voltage and regulate the output voltage.

FIGS. 11A-11C are graphs showing simulation results of DC bus voltage fluctuations on a low-inertia DC microgrid due to changes in solar irradiation with and without VIEC. In FIG. 11A, the solar radiation falling on a PV solar panel varies with the time of day, and as clouds block sunlight. In FIG. 11B, without Virtual Inertia Enhancement (VIE), when solar irradiance changes, the DC bus voltage of the microgrid being powered by the PV panels can fluctuate by up to 7%.

FIG. 11C shows that PV controller 40 with VIEC 42 causing DC-DC converter 22 to emulate virtual capacitor 26 (FIG. 9) substantially reduces these DC bus voltage fluctuations due to solar irradiation changes.

FIGS. 12A-12C are graphs showing simulation results of DC bus voltage fluctuations on a low-inertia DC microgrid due to loading changes with and without VIEC. In FIG. 12A, the load current drawn from the microgrid varies over time. When the load suddenly switches to a higher load current, the DC bus voltage can dip lower. These voltage drops can be as much as 6 to 14% as shown in FIG. 12B.

FIG. 12C shows that battery controller 50 with VIEC 52 causing DC-DC converter 32 to emulate virtual capacitor 36 (FIG. 7) substantially reduces these DC bus voltage fluctuations due to load changes.

FIGS. 13A-13C are graphs showing simulation results of DC bus voltage fluctuations on a microgrid due to changes in solar irradiation and loading, with and without VIEC. In FIG. 13A, the solar radiation falling on a PV solar panel varies with the time of day, and as clouds block sunlight, as shown in FIG. 11A. Also, the load varies as shown in FIG. 12A. FIG. 13B shows the combined effect of solar irradiance and loading changes on the DC bus voltage. The DC bus voltage can have voltage fluctuations of as much as 6% to 14% overall.

FIG. 13C shows that PV controller 40 with VIEC 42 causing DC-DC converter 22 to emulate virtual capacitor 26 (FIG. 10) substantially reduces these DC bus voltage fluctuations due to solar irradiation changes. Also, battery controller 50 with VIEC 52 causing DC-DC converter 32 to emulate virtual capacitor 36 (FIG. 10) substantially reduces these DC bus voltage fluctuations due to load changes. These DC voltage fluctuations are undesirable as they can cause switch failures in DC-DC converters, fast decay of battery life, and load shedding.

Figure 14:
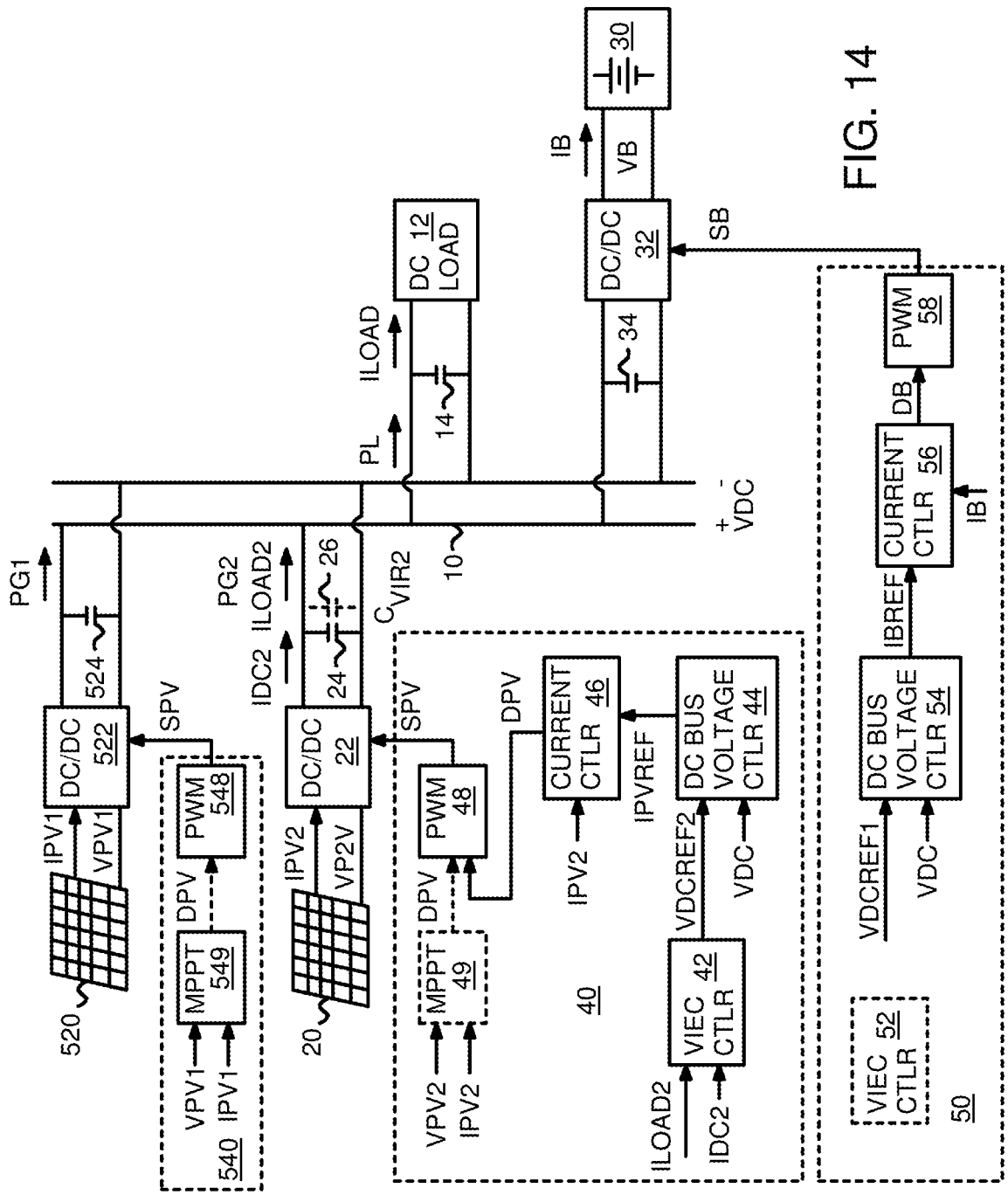
FIG. 14 shows a multiple-PV low-inertia DC microgrid with a Virtual Inertia Enhancement Controller (VIEC) implemented for both PV and battery DC-DC converters.

FIG. 14 shows a multiple-PV low-inertia DC microgrid with a Virtual Inertia Enhancement Controller (VIEC) implemented for both PV and battery DC-DC converters. In this alternative, there are more than one PV array 20. Additional PV array 520 supplies PV power PG1 to DC bus 10 through DC-DC converter 522. Capacitor 524 filters ripple from DC-DC converter 522. PV controller 540 has MPPT controller 549 that multiplies voltage VPV1 by current IPV1 from PV array 520 to get the PV power from PV array 520 and then adjusts DPV to PWM generator 548 to generate switching signals SPV to DC-DC converter 522 that have a maximum power.

However, VIEC is not implemented on battery controller 50. Instead, VIEC 42 subtracts IDC2 from ILOAD2 and performs other operations shown in FIG. 14 to adjust VDCREF2. DC bus voltage controller 44, current controller 46, and PWM generator 48 operate as described before for FIG. 9. MPPT 49 is activated for mode 1 when VIEC 42 is disabled. MPPT 49 gets the PV power by multiplying VPV2 by IPV2 for PV array 20.

Thus, in this embodiment VIEC is implemented on only one of the PV arrays, PV array 20, not on all PV arrays 520. There can be multiple PV array 520 each with its own DC-DC converter 522.

Figure 15:
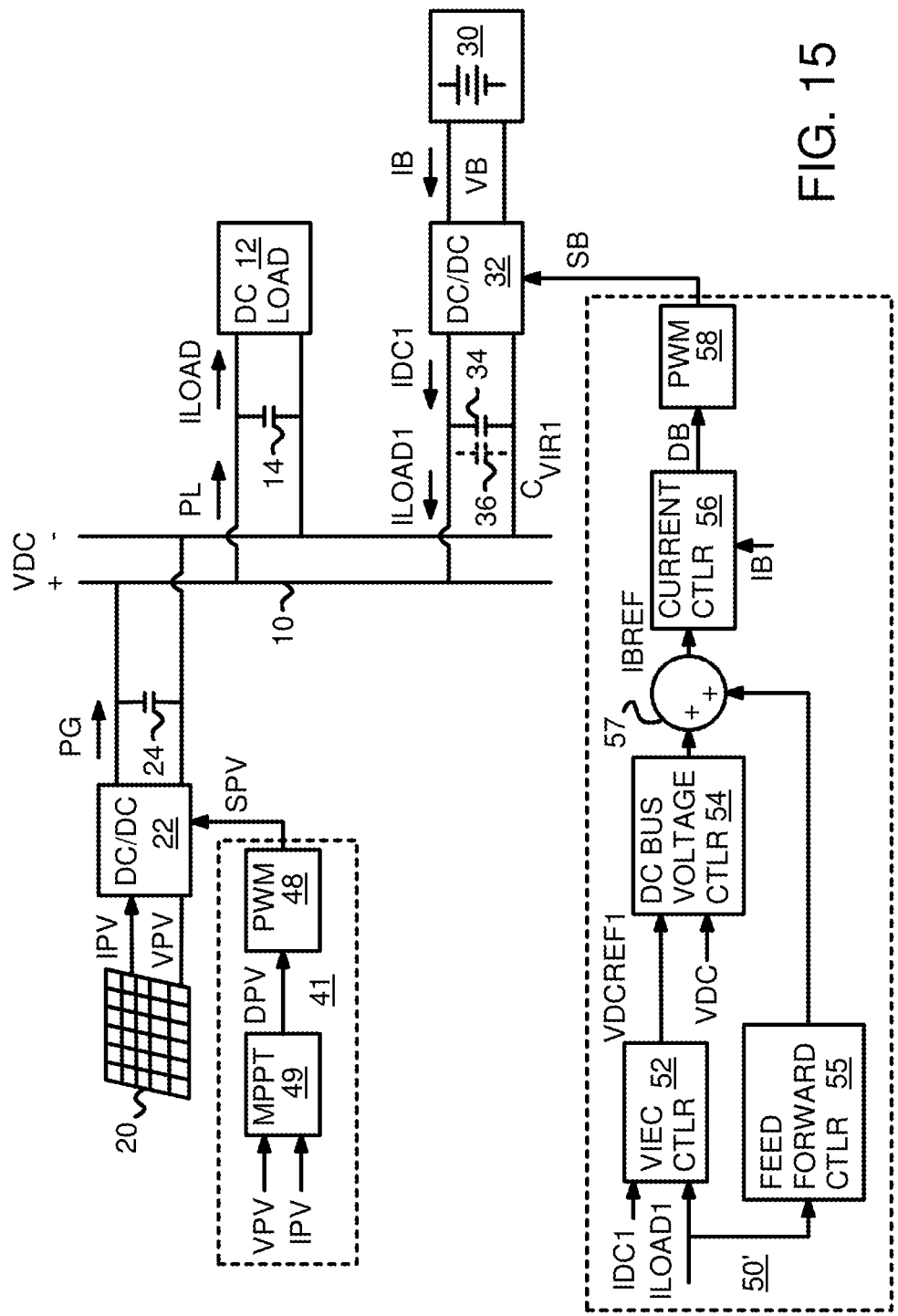
FIG. 15 shows an improvement in VIEC with feed-forward control in the battery controller.

FIG. 15 is an alternative DC microgrid with feed-forward control in the battery controller. Feed-forward controller 55 in battery controller 50' reads load current ILOAD1 that is input to VIEC 52, and forwards a signal based on the value of ILOAD1 that is added to reference current IBREF from DC bus voltage controller 54. The combined value from adder 57 is applied as IBREF to current controller 56.

Feed-forward controller 55 improves the response time of battery controller 50' by forwarding changes in load current ILOAD1 to current controller 56, thus bypassing delays from VIEC 52 and DC bus voltage controller 54. The amount of change to IBREF due to ILOAD1 can be adjusted, such as with a scaling factor. Thus, the sensitivity of forwarding can be adjusted.

VIEC 52 and DC bus voltage controller 54 still operate as before to adjust IBREF, but adder 57 allows for ILOAD1 feedforward control implementation.

ALTERNATE EMBODIMENTS

Several other embodiments are contemplated by the inventors. For example, many combinations and variations of the low-inertia DC microgrids and DC-DC converters are possible. Using DC-DC converters to emulate virtual capacitors saves the cost, space requirements, and power loss of physical capacitors while achieving the improvement of inertia for better DC voltage stability on a low-inertia DC microgrid.

VIEC 52 can be implemented in various ways. The blocks of FIG. 6 could be hardware blocks, or a programmable logic array used. Some or all of the operations in FIG. 6 could be implemented by a processor such as a Digital Signal Processor (DSP).

While a single battery 30 and its DC-DC converter 32 have been described, there could be multiple batteries and multiple DC-DC converters. VIEC 52 could be implemented for only one of these batteries, or on a subset of the batteries, or VIEC 52 could be replicated for each battery controller 50 for each of the batteries. The load may be much more complex and have multiple DC-DC converters for subsets of the load. Other devices and subsystems could be added to the low-inertia DC microgrid and connect to DC bus 10. While DC/AC converter 13 and AC load 15 have been shown in FIG. 7, these may be present or absent in any of FIGS. 1, 7, 9, 10, 14, 15.

While SOC targets such as 40% and 95% have been described in FIG. 8, other SOC limits could be substituted.

Rather than switch modes at PREF=0, other values of PREF could be the mode inflexion point. Additional modes could be added, especially for more complex low-inertia DC microgrids.

While battery controller 50 and PV controller 40 have been described with DC bus voltage controllers that drive current controllers that then control PWM, other control arrangements and variations could be substituted. PI controllers used in voltage and current control can be substituted with PID, model predictive, adaptive or fuzzy logic controllers. While battery storage devices have been described, other storage devices could be substituted, such as supercapacitors, ultra capacitors, or different types of batteries such as lithium-ion or lead acid. While a DC voltage of 750 volts has been described, other DC voltages could be substituted. Multiple low-inertia DC microgrids could be connected together to DC bus. The load devices may include those for AC loads when an DC-AC converter is provided on DC bus 10.

DC bus 10 could occasionally connect to an AC power grid. While islanded DC microgrids may never connect to a utility grid, other low-inertial DC microgrids may connect to a utility grid. The DC bus of a grid-connected low-inertia DC micro grid could connect to a utility grid using a Voltage Source Converter (VSC). The grid connection could be temporary or permanent. The voltage of DC bus 10 has been shown in the graphs to be 750 volts DC, but other voltages could be substituted. This could be sub-grids or sections of DC bus 10 that are connected to other sections, perhaps with DC-DC converters between DC buses with different DC voltages, or sections for different loads or PV generators.

The relative size of virtual capacitor 26 relative to capacitor 24, or of virtual capacitor 36 relative to capacitor 34 could vary. Ratios such as 1:1 or 1:4 could be targeted, or ratios of 1:1 to 1:5.

DC-DC converters can be Buck converters, Boost converters, LLC resonant converters, and use advanced transistors such as silicon carbide (SiC), Gallium Nitride (GaN) or other advanced technologies.

At the Maximum Power Point (MPP), the differential of power over voltage is zero. The PV system should operate at, or close to, the MPP of the PV panel under varying conditions, like changing solar insolation, temperature, and load.

Maximum power point tracking (MPPT) can be an algorithm implemented in the photovoltaic (PV) array interfacing DC-DC converter which continuously adjusts the impedance seen by the PV array (or its input impedance) such that the PV operates at MPP which is done by varying the duty cycle (DPV) of PWM block which generates the switching signal (SPV) for the DC-DC converter. MPPT can continuously measure the voltage VPV, current IPV and power P=IPV*VPV and track the change in P (dP) and the change in V (dV) in every cycle to reach at MPP. If dP>0 and dV>0, DPV should be increased, dP>0 and dV<0, DPV should be decreased, dP<0 and dV>0, DPV should be decreased, dP>0 and dV<0, DPV should be increased. MPPT can use the hill climbing approach to reach at MMP.

More complex buffers, level shifters, or other components could be substituted or added. Inversions could be added at various locations. Hysteresis of other delays and output wave shaping could be added.

Different transistor, capacitor, resistor, and other device sizes can be used, and various layout arrangements can be used, such as multi-leg, ring, doughnut or irregular-shape transistors. Currents can be positive or negative currents and flow in either direction. Many second and third order circuit effects may be present and may be significant, especially for smaller device sizes. A circuit simulation may be used to account for these secondary factors during design.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus, inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A virtual-inertia-enhanced low-inertia DC microgrid comprising:
   a DC bus having a DC bus voltage;
   a load drawing a load power from the DC bus;
   a second DC-DC converter, connected to a photovoltaic (PV) array, that receives a PV current having a PV voltage from the PV array, the second DC-DC converter having power semiconductors controlled by second switching signals that convert the PV voltage to the DC bus volage on a second output;
   a second output capacitor connected to the second output, wherein a second DC current generated by the second DC-DC converter flows into the second output capacitor, and a second load current flows out of the second output capacitor and onto the DC bus;

a second controller for generating the second switching signals to the second DC-DC converter to adjust the second DC current to maintain the DC bus voltage;
a second Virtual Inertia Enhancement Controller (VIEC) in the second contoller, the second VIEC causing the second controller to adjust the second switching signals in response to a difference of the second DC current and the second load current to enhance an effective capacitance of the second output capacitor;
a first DC-DC converter, connected to a battery, that receives a battery current having a battery voltage from the battery, the first DC-Dc converter having power semiconductors controlled by first switching signals that concert the battery volage to the DC bus voltage on a first output,
a first output capacitor connected to the first output, wherein a first DC current generated by the first DC-DC converter flows into the first output capacitor, and a first load current flows out of the first output capacitor and onto the DC bus;
a first controller for generating the first switching signals to the first DC-Dc converter to adjust the first DC current to maintain the DC bus voltages; and
a first Virtual Inertia Enhancement Controller (VIEC) in the first controller, the first VIEC causing the first controller to adjust the first switching signals in response to a difference of the first DC current and the first load current to enhance an effective capacitance of the first output capacitor;
wherein the second controller further comprises:
the second Virtual Inertia Enhancement Controller (VIEC) in the second controller, the second VIEC adjusting a second reference voltage in response to a difference of the second DC current and the second load current;
a second DC bus voltage controller that compares the DC bus voltage to the second reference voltage to generate a second reference current;
a second current controller that compares the PV current to the second reference current to generate a second pulsewidth control signal;
a second Pulse Width Modulation (PWM) generator that generates the second switching signals with pulsewidth controlled by the second pulsewidth control signal.

2. The virtual-inertia-enhanced low-inertia DC microgrid of claim 1 wherein the second controller further comprises:
a Maximum Power Point Tracking (MPPT) controller multiplying the PV current by the PV voltage to obtain a PV power, the MPPT controller adjusting the second pulsewidth control signal to operate PV array at maximum power point.

3. The virtual-inertia-enhanced low-inertia DC microgrid of claim 2 wherein the first controller further comprises:
the first VIEC in the first controller, the first VIEC adjusting a first reference voltage in response to a difference of the first DC current and the first load current;
a first DC bus voltage controller that compares the DC bus voltage to the first reference voltage to generate a first reference current;
a first current controller that compares the battery current to the first reference current to generate a first pulsewidth control signal;
a first PWM generator that generates the first switching signals with pulsewidth controlled by the first pulsewidth control signal.

4. The virtual-inertia-enhanced low-inertia DC microgrid of claim 3 wherein a PV power is the PV voltage multiplied by the PV current;
wherein the second VIEC is enabled when the PV power exceeds the load power and disabled when the load power exceeds the PV power;
wherein the first VIEC is enabled when the load power exceeds the PV power and the battery exceeds a first target State of Charge (SOC).

5. The virtual-inertia-enhanced low-inertia DC microgrid of claim 4 wherein the first VIEC is disabled when the PV power exceeds the load power and the battery does not exceed a second target SOC that is greater than the first target SOC.

6. The virtual-inertia-enhanced low-inertia DC microgrid of claim 5 wherein both the first VIEC and the second VIEC are enabled when the PV power exceeds the load power and the battery SOC exceeds the second target SOC.

7. The virtual-inertia-enhanced low-inertia DC microgrid of claim 6 wherein the MPPT controller is disabled when the second VIEC is enabled.

8. The virtual-inertia-enhanced low-inertia DC microgrid of claim 4 wherein the first VIEC further comprises:
a first subtractor for subtracting the first DC current from the first load current to generate a first difference;
a first feedback subtractor for subtracting a first feedback signal from the first difference to generate a feedback difference;
a first multiplier for multiplying the feedback difference with a reciprocal of a first virtual capacitance value to generate the first reference voltage;
a first feedback path subtractor for subtracting a nominal reference voltage from the first reference voltage to generate a first path signal;
a first conductance multiplier for multiplying the first path signal with a first conductance value to generate the first feedback signal;
wherein the second VIEC further comprises:
a second subtractor for subtracting the second DC current from the second load current to generate a second difference;
a second feedback subtractor for subtracting a second feedback signal from the second difference to generate a feedback difference;
a second multiplier for multiplying the feedback difference with a reciprocal of a second virtual capacitance value to generate the second reference voltage;
a second feedback path subtractor for subtracting a nominal reference voltage from the second reference voltage to generate a second path signal; and
a second conductance multiplier for multiplying the second path signal with a second conductance value to generate the second feedback signal.

9. The virtual-inertia-enhanced low-inertia DC microgrid of claim 8 wherein the reciprocal of the second virtual capacitance value is scaled.

10. The virtual-inertia-enhanced DC microgrid of claim 5 wherein the DC bus is isolated from a utility grid.

11. The virtual-inertia-enhanced low-inertia DC microgrid of claim 3 wherein the first controller further comprises:
a feed-forward controller that forwards the first load current to be combined with an input to the first current controller.

12. A high-inertia DC microgrid comprising:
a Direct Current (DC) bus having a DC voltage that connects to multiple nodes;
a load on the DC bus that receives a load power;

a battery storage unit for storing energy;
a first output capacitor connected between the DC bus and a first output;
a first DC-DC converter connected between the battery storage unit and the first output;
a first controller generating first control signals to the first DC-DC converter;
a first Virtual Inertia Enhancement Controller (VIEC) that generates a first difference of a first output current from the first DC-DC converter to the first output, and a first load current from the first output capacitor to the DC bus, the first VIEC causing the first controller to adjust the first control signals to increase the first output current by a function of the first difference and a reciprocal of a first virtual capacitance value;
wherein the first VIEC causes the first DC-DC converter to emulate a first virtual capacitor having the first virtual capacitance value.

13. The high-inertia DC microgrid of claim 12 further comprising:
a photovoltaic (PV) array for generating PV energy;
a second output capacitor connected between the DC bus and a second output;
a second DC-DC converter connected between the PV array and the second output;
a second controller generating second control signals to the second DC-DC converter; and
a second VIEC that generates a second difference of a second output current from the second DC-DC converter to the second output, and a second load current from the second output capacitor to the DC bus, the second VIEC causing the second controller to adjust the second control signals to increase the second output current by a function of the second difference and a reciprocal of a second virtual capacitance value;
wherein the second VIEC causes the second DC-DC converter to emulate a second virtual capacitor having the second virtual capacitance value;
wherein the first VIEC is disabled when the battery storage unit has a State of Charge (SOC) of less than a target SOC;
wherein the second VIEC is disabled when the load power exceeds PV power supplied by the PV array;
whereby DC bus inertia is increased by the VIEC causing DC-DC converters to emulate virtual capacitors.

14. The high-inertia DC microgrid of claim 13 wherein the first VIEC further comprises:
a first feedback adder that subtracts a first feedback signal from the first difference to generate a first corrected difference;
a first multiplier that multiplies the first corrected difference with a reciprocal of first virtual capacitance value to generate a first reference voltage;
a first nominal feedback adder that subtracts a first nominal voltage from the first reference voltage to generate a first corrected feedback signal;
a first feedback multiplier that multiples the first corrected feedback signal with a first conductance to generate the first feedback signal.

15. The high-inertia DC microgrid of claim 14 wherein the second VIEC further comprises:
a second feedback adder that subtracts a second feedback signal from the second difference to generate a second corrected difference;
a second multiplier that multiplies the second corrected difference with a reciprocal of second virtual capacitance value to generate a second reference voltage;
a second nominal feedback adder that subtracts a second nominal voltage from the second reference voltage to generate a second corrected feedback signal;
a second feedback multiplier that multiples the second corrected feedback signal with a second conductance to generate the second feedback signal.

16. The high-inertia DC microgrid of claim 15 wherein the first controller further comprises:
a first DC bus voltage controller that generates a first reference current as a function of a difference of the first reference voltage from the first VIEC and the DC bus voltage;
a first current controller that generates a first pulsewidth control signal as a function of the first reference current and a first current from the battery storage unit into the first DC-DC converter;
a first Pulse Width Modulator (PWM) that generates first switching signals to power transistors in the first DC-DC converter, the first PWM adjusting a pulsewidth of the first switching signals in response to the first pulsewidth control signal;
wherein the second controller further comprises:
a second DC bus voltage controller that generates a second reference current as a function of a difference of the second reference voltage from the second VIEC and the DC bus voltage;
a second current controller that generates a second pulsewidth control signal as a function of the second reference current and a second current from the PV array into the second DC-DC converter;
a second Pulse Width Modulator (PWM) that generates second switching signals to power transistors in the second DC-DC converter, the second PWM adjusting a pulsewidth of the second switching signals in response to the second pulsewidth control signal.

17. The high-inertia DC microgrid of claim 16 wherein the second controller further comprises:
a Maximum Power Point Tracking (MPPT) module that generates the second pulsewidth control signal to the second PWM when the second VIEC is disabled, the MPPT adjusting the second pulsewidth control signal to maximize PV power from the PV array.

18. A Virtual Inertia Enhancement Controller (VIEC) comprising:
a first adder that receives an input current into an output capacitor placed between an output of a DC-DC converter and a DC bus on a microgrid, the first adder also receiving an output current from the output capacitor to the DC bus, the first adder generating a first difference of the input current and the output current;
a second adder that receives a feedback signal and the first difference and generates a second difference;
a first multiplier that divides the second difference by a virtual capacitance value to generate a first result;
a second multiplier that divides the first result by a scaling factor to generate a reference voltage;
a third adder that receives a nominal reference voltage and the reference voltage and generates a third difference; and
a third multiplier that multiplies the third difference by a conductance value to generate the feedback signal;
wherein the reference voltage is compared to a DC bus voltage to generate an adjustment signal to adjust an output current from an DC-DC converter to compensate for voltage fluctuations on the DC bus by emulating the virtual capacitance value.

* * * * *